United States Patent
Williamson et al.

(10) Patent No.: US 6,522,691 B1
(45) Date of Patent: Feb. 18, 2003

(54) METHOD OF AND APPARATUS FOR DETERMINING THE CAPACITY OF A TELECOMMUNICATIONS SYSTEM

(75) Inventors: Roger Williamson, Herts (GB); Christopher Tate, Herts (GB); Andrew D Wallace, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/383,645

(22) Filed: Aug. 26, 1999

(30) Foreign Application Priority Data

Jun. 28, 1999 (GB) .............................. 9915103

(51) Int. Cl.$^7$ .............................. H04B 17/00
(52) U.S. Cl. ................. 375/227; 375/260; 370/252
(58) Field of Search ................. 375/224, 227, 375/222, 260; 370/252; 379/24; 702/111

(56) References Cited

U.S. PATENT DOCUMENTS 6,317,495 B1 * 11/2001 Gaikwad et al. ............ 370/201

2001/0031016 A1 * 10/2001 Seagraves .................. 375/264

OTHER PUBLICATIONS

'Kurtosis' 3 Page printout dated May 28, 2002 from http://mathworld.wolfram.com/Kurtosis.html.

* cited by examiner

*Primary Examiner*—Amanda T. Le
(74) *Attorney, Agent, or Firm*—Lee, Mann, Smith, McWilliams, Sweeney & Ohlson

(57) ABSTRACT

A method of and apparatus for capacity determination in a telecommunications system, in the presence of Gaussian and non-Gaussian noise. The ratio of Gaussian to non-Gaussian noise is determined utilising a statistical metric. Preferably the metric is Kurtosis or the $3^{rd}$ Cumulant of the Probability Density of the signal at each frequency. The determination of the ratio of Gaussian to non-Gaussian noise enables a more accurate determination of Noise, which in turn allows greater utilisation of actual available capacity in the system.

16 Claims, 2 Drawing Sheets

METHOD OF AND APPARATUS FOR DETERMINING THE CAPACITY OF A TELECOMMUNICATIONS SYSTEM

BACKGROUND OF THE INVENTION

This invention relates generally to a method of and apparatus for determining the capacity of a telecommunications system and in particular to a method and apparatus for use in the presence of non-Gaussian noise.

FIELD OF THE INVENTION

A common source of noise in, for example, an x-Digital Subscriber loop (xDSL) system that utilises copper cables to send signals is Amplitude Modulated (AM) signals from Broadcast Radio in the Medium Wave Band (MW). These noise signals reside in the centre of the transmission bands of both Asymmetric Digital Subscriber Loop (ADSL) and Very High Speed Digital Subscriber Loop (VDSL) systems.

These signals typically have a modulation Index of 80%, which is predominantly sinusoidal in its Probability Density Function (PDF). It will be shown below that using solely the RMS value of this noise and assuming it to be Gaussian in its PDF, as with prior art methods, will severely underestimate the available capacity of a telecommunications system.

One of the problems addressed by the invention is, how to calculate the available capacity in, for example, a Quadrature Amplitude Modulation (QAM) based modulation system more accurately than previously used methods. In order to address this problem the signal to noise ratio for a carrier needs to be measured differently.

The usual measure of Signal to Noise (SNR) ratio is the root mean square (RMS) value of the noise at the carrier frequency. This, however, does not indicate any other property of the noise such as its peak value, which is a crucial property for error free performance. If the type of noise is known, then from its probability density function (PDF), a relationship between its RMS value and the probability of a peak can be obtained. In the case of Gaussian noise, however, in principal the peak size may be infinite.

The metric used, therefore, is the peak level that occurs with a given level of probability, which corresponds to a particular error rate for the xDSL system. For instance, for measurement purposes, it is common to use a Bit Error Rate (BER) of 1 in [1e7] $10^7$. The ratio of the peak level and the RMS value is about 5.3 or 14.5 dB for Gaussian noise. For sinusoidal noise, however, the peak to RMS ratio is 1.414 (square root of 2) or 3 dB. The difference between the two types of noise is therefore 11.5 dB. Therefore, the assumption that noise is Gaussian has lead, in presently used methods, to an over estimation of the noise in the system and consequently to an under utilisation of actual available capacity.

FIGS. 1 and 2 illustrate a Gaussian noise signal and a sinusoidal noise signal such as that presented by an AM signal, and their PDF, respectively.

For example in QAM modulation, 3 dB of SNR are required for each bit. Thus for a given level of RMS noise, nearly 4 extra bits are possible if the noise is sinusoidal. In a multi-carrier system where bits are allocated during training, such as in Coded Orthogonal Frequency Division Multiplexing (COFDM), there is therefore significant benefit if the type of noise can be measured when allocating the maximum number of bits to a carrier.

SUMMARY OF THE INVENTION

It is an object of the present invention to address the problem of the over-estimation of noise in a telecommunications system and the resultant under-utilisation of available capacity.

It is a further object of the present invention to distinguish between Gaussian and non-Gaussian noise in a telecommunications system.

According to a first aspect of the present invention there is provided a method of determining the capacity of a telecommunications system, in the presence of Gaussian and non-Gaussian noise, wherein the ratio of Gaussian to non-Gaussian noise is determined utilising a statistical metric.

According to a second aspect of the present invention there is provided a telecommunications apparatus for use in a telecommunications system, in the presence of Gaussian and non-Gaussian noise, comprising a processor arranged to determine the capacity of the system by determining the ratio of Gaussian to non-Gaussian Noise utilising a statistical metric.

Preferably, the apparatus is an xDSL modem.

According to a third aspect of the present invention there is provided a method of bit allocation in a telecommunications system, in the presence of Gaussian and non-Gaussian noise, wherein the ratio of Gaussian to non-Gaussian noise is determined utilising a statistical metric.

According to a fourth aspect of the present invention there is provided a computer program product stored on a computer readable medium, having thereon computer program means for causing a computer which governs the operation of a telecommunications apparatus in a telecommunications system, in the presence of Gaussian and non-Gaussian noise, to determine the capacity of the system by determining the ratio of Gaussian to non-Gaussian Noise utilising a statistical metric Preferably, the statistical metric is the Kurtosis of the Probability Density of the signal at each frequency.

Alternatively, the statistical metric is the 3rd Cumulant of the Probability Density of the signal at each frequency.

Preferably, the telecommunications system utilises a modulation scheme selected from the following: Quadrature Amplitude Modulation (QAM); OFDM or COFDM It is an advantage of the present invention that the capacity issue is addressed by using other statistical metrics as well as the RMS (standard deviation) to estimate the available capacity. This is in stark contrast to prior art bit allocation and capacity management methods in which only the RMS value has been used to estimate the bit SNR and hence the available capacity.

BRIEF DESCRIPTION OF THE DRAWINGS

The invention will be better understood from the following description of the service provisioning methodology together with reference to the accompanying drawings, in which.

STATISTICAL ANALYSIS

As stated above the method in accordance with the present invention makes use of the properties of statistical functions called cumulants. For Gaussian noise, the first two cumulants K2 and K3 are the only ones that are non-zero. The next cumulant K4 and all subsequent cumulants should be zero. An alternative statement of K4 being zero is that the measure of Kurtosis for the distribution is 3 for a Gaussian signal. The measure of Kurtosis for a sinusoidal distribution is 1.5. Noise made up of a mixture of Gaussian and sinusoidal signals will have a Kurtosis number between 1.5 and 3. Moreover, there is a relationship between the Kurtosis number and the peak to RMS value for a given BER. For instance, for Gaussian noise with Kurtosis of 3 the peak to mean for 1 in $10^7$ BER is 5.3. For sinusoid noise the numbers are 1.5 and 1.414 respectively. The relationship follows a smooth curve between these extremes. It is thus possible for a person skilled in the art to use this information to calculate the optimum number of bits capable of being used under error free performance from a measure of the variance and the Kurtosis of the noise distribution.

As discussed above, there is a simple relationship between the fourth cumulant and the fourth and second moments about the mean. The second moment about the mean is the variance or the square of the RMS and is obtained by summing the square of the difference between each value and the mean. The fourth moment is the sum of those values squared again and thus is relatively easy to construct. The ratio of the fourth moment to the square of the second moment is called the measure of Kurtosis and is 3 for a Gaussian distribution. Distributions that are a flattened form of the Gaussian are called Platykurtic and have a Kurtosis number less than 3. Sharper distributions are called Leptokurtic and have Kurtosis numbers greater than 3. A sinusoid is concave and has a Kurtic number of 1.5.

Furthermore, simulations using random data have shown that the Kurtosis number becomes fairly stable after a small data set, so that the method can be used for training where little data is available.

DETAILED DESCRIPTION

Figure 1:
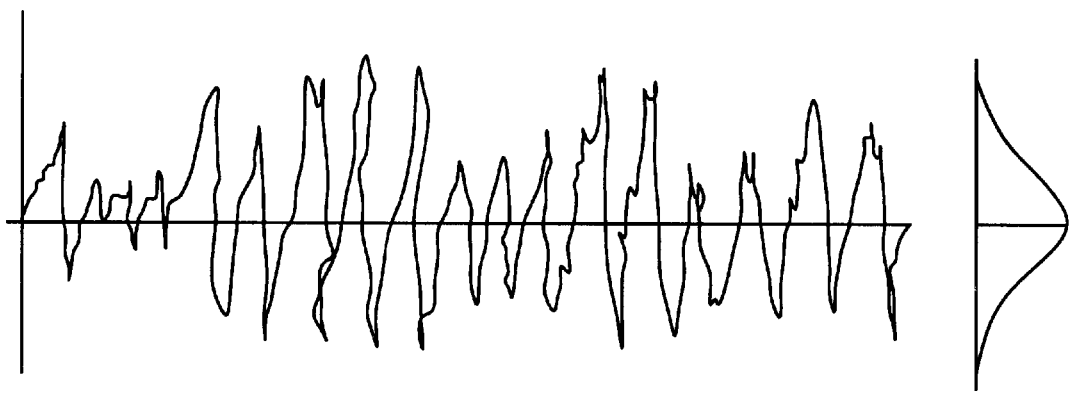
FIG. 1 illustrates a Gaussian Noise signal and its probability density.
Figure 2:
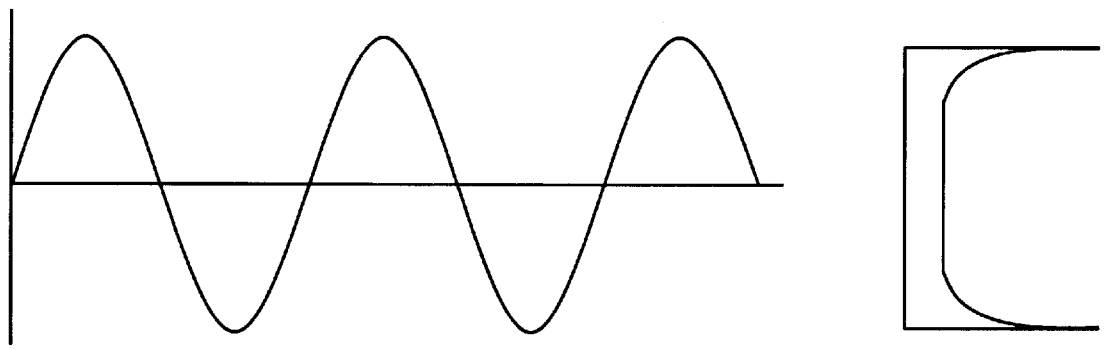
FIG. 2 illustrates a Sinusoidal Noise signal and its probability density.
Figure 3:
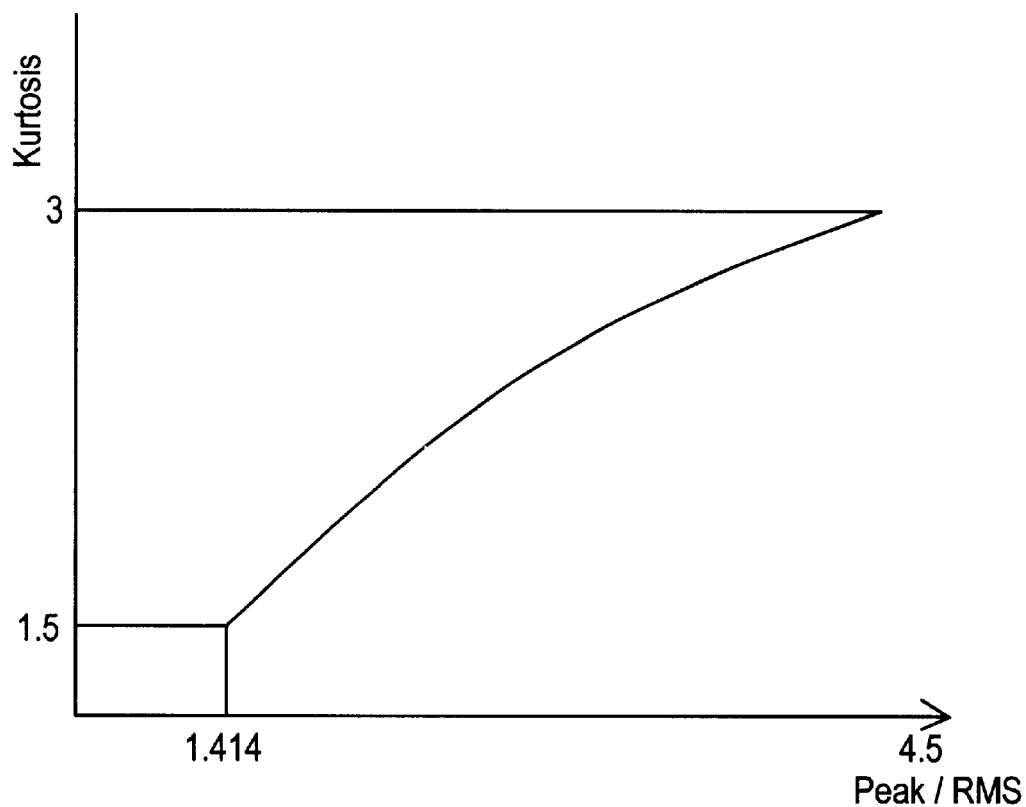
FIG. 3 illustrates a Kurtosis diagram illustrating the Gaussian and non-Gaussian Noise signals in terms of Kurtosis number.
Figure 4:
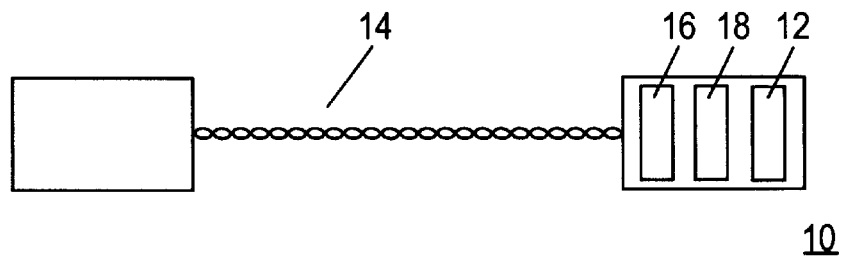
FIG. 4 illustrates a telecommunications system including an apparatus in the form of an xDSL modem, in accordance with the present invention, which is suitable for use in both single carrier (CAP or QAM) and multi-carrier (Digital Multi-Tone (DMT)) systems.

Referring to the drawings FIG. 4, illustrates a telecommunications system 10 including an apparatus in the form of an xDSL modem 12, in accordance with the present invention, which is suitable for use in both single carrier (Carrierless Amplitude and Phase (CAP) or QAM) and multi-carrier (DMT) systems.

Such a system is designed to operate using existing copper unshielded twisted pair cable 14 which is designed for Plain Ordinary Telephone Service (POTS) using frequencies up to 4 kHz only. Since the cable 14 is unshielded and not perfectly balanced, radio frequency signals can get onto the cable. These frequencies are the same as used by xDSL systems and will therefore reduce the capacity of the system. Such interference is predominantly sinusoidal in its PDF, whereas many other noise sources are Gaussian. The assumption of a Gaussian PDF of the noise source by the modem 12 will significantly underestimate the available capacity of the system 10.

The process used in decoding a signal at the modem 12 in the presence of noise includes the use of a high pass filter 16 on the input to the modem 12 to reduce interference from/ with POTS. This will typically be integrated with the isolating line transformer (not shown), which is both driven from the transmit line driver and drives the receiver. There is also a circuit (often called a Hybrid) 18 to reduce the level of transmit signal present in the receive circuit. This can also be reduced by means of echo cancelling methods. However, the modem 12 is incapable of distinguishing the wanted signal being received from other signal already on the line such as crosstalk from other users or radio frequency signals picked up on the cable 14. The receiver will therefore have to handle both the wanted and noise signals.

Typically the detection will be conducted in the digital domain, and the receive signal will be converted appropriately by an Analogue-to-Digital Converter (ADC). For a DMT system, the digital time domain receive signal will be converted into the frequency domain using a Fourier transform. This will calculate both the amplitude and phase of the frequencies making up the receive signal. There follows an equaliser which multipliers each of these outputs by a complex number to compensate for amplitude and phase variations on the line. The demodulation of each of the carriers now follows and consists of making a decision as to the closest constellation point to those allocated to each carrier. In the process, the difference between the actual and theoretical position is calculated and this value is used to build up the statistics of the noise on each constellation. The noise statistics is used initially during training to decide on the bit allocation for each carrier, and is subsequently used to reallocate bits as the noise on the line changes. Ordinarily, the second moment about the mean (also called variance) and the noise PDF is assumed to be Gaussian. By taking the fourth moment and normalising it against the square of the variance, the Kurtosis of the signal can be calculated.

High signal levels have been measured on telephone lines, in which simulations using a simple RMS Gaussian measurement to calculate capacity significantly diminishes the capacity of the modem. The application of the method of this invention will significantly increase the capacity of a modem in the presence of AM Radio Frequency Interference (RFI). The method also gives a significant advantage to VDSL. Indeed the method is applicable to all QAM modulation methods.

Modifications may be incorporated with out departing from the scope or spirit of the invention.

We claim:

1. A method of determining the capacity of a telecommunications system, in the presence of Gaussian and non-Gaussian noise, the method comprising the steps of:

receiving a signal comprising at least one channel;

determining a statistical metric representative of noise associated with the signal;

determining a ratio of Gaussian to non-Gaussian noise responsive to the statistical metric.

2. The method of claim 1, wherein the statistical metric is the Kurtosis of the Probability Density of the signal at each frequency.

3. The method of claim 1, wherein the statistical metric is the 3rd Cumulant of the Probability Density of the signal at each frequency.

4. The method of claim 1, wherein the telecommunications system utilises a modulation scheme selected from the following: Quadrature Amplitude Modulation (QAM), OFDM and COFDM.

5. A method according to claim 1 in which the noise comprises AM Radio Frequency interference.

6. A method according to claim 1 in which the channel is one of a VDSL channel and a ADSL channel.

7. A telecommunications apparatus for use in a telecommunications system, in the presence of Gaussian and non-Gaussian noise, the apparatus comprising:

an input arranged to receive a signal comprising at least one channel;

a processor arranged to determine a statistical metric representative of noise associated with the signal and to determine a ratio of Gaussian to non-Gaussian noise responsive to the statistical metric.

8. The apparatus of claim 7, wherein the statistical metric is Kurtosis of the Probability Density of the signal at each frequency.

9. The apparatus of claim 7, wherein the statistical metric is the 3rd Cumulant of the Probability Density of the signal at each frequency.

10. The apparatus of claim 7, in the form of an xDSL modem.

11. A method of bit allocation in a telecommunications system, in the presence of Gaussian and non-Gaussian noise, the method comprising the steps of:

receiving a signal comprising at least one channel;

determining a statistical metric representative of noise associated with the signal;

determining a ratio of Gaussian to non-Gaussian noise responsive to the statistical metric;

allocating bits to at least one of the at least one channels responsive to the ratio of Gaussian to non-Gaussian noise.

12. The method of claim 11, wherein the statistical metric is Kurtosis of the Probability Density of the signal at each frequency.

13. The method of claim 11, wherein the statistical metric is the 3rd Cumulant of the Probability Density of the signal at each frequency.

14. A computer program product stored on a computer readable medium, having thereon computer program means for causing a computer which governs the operation of a telecommunications apparatus in a telecommunications system, in the presence of Gaussian and non-Gaussian noise, the program having code portions arranged to:

receive a signal comprising at least one channel;

determine a statistical metric representative of noise associated with the signal;

determine a ratio of Gaussian to non-Gaussian noise responsive to the statistical metric.

15. The computer program product of claim 14, wherein the statistical metric is Kurtosis of the Probability Density of the signal at each frequency.

16. The computer program product of claim 14, wherein the statistical metric is the 3rd Cumulant of the Probability Density of the signal at each frequency.

* * * * *